Jan. 18, 1966    C. T. KLEINER    3,230,440
POWER SUPPLY WITH SHORT CIRCUIT PROTECTION
Filed April 2, 1962    2 Sheets-Sheet 1

*INVENTOR.*
CHARLES T. KLEINER
BY *Sidney Magnes*

AGENT

INVENTOR.
CHARLES T. KLEINER
BY *Sidney Magnes*

AGENT

United States Patent Office 3,230,440
Patented Jan. 18, 1966

3,230,440
POWER SUPPLY WITH SHORT CIRCUIT PROTECTION
Charles T. Kleiner, Long Beach, Calif., assignor to North American Aviation, Inc.
Filed Apr. 2, 1962, Ser. No. 184,361
5 Claims. (Cl. 321—11)

This invention relates to a power supply; and more particularly to a power supply that converts A.C. electricity to D.C. electricity for a load that requires a very large current while affording protection from possible short-circuits across the load.

Many types of devices, or loads are designed to work from D.C. electricity where only A.C., electricity is available. The circuitry that converts the available A.C. to the desired D.C. is frequently known as a "power supply," since it supplies the necessary power for the load.

The power supply must satisfy a number of requirements. Among these requirements are the ability to maintain the output voltage at a predetermined value; the necessity for providing a very large current for the load; and the ability to disable itself when a "short-circuit" occurs, since the short-circuit may do a great deal of damage if the power supply were not disabled.

Many power supplies have been designed in the past; but in general they have three important disadvantages. The first disadvantage is that the power supply itself absorbs a certain amount of power, and the overall efficiency is therefore reduced. A second disadvantage is that the power supply becomes quite hot, and therefore frequently requires artificial cooling, or free circulation of cool air. A third disadvantage is that many power supplies react quite slowly when a dangerous short circuit appeared, or is removed.

It is therefore the principal object of my invention to provide an improved power supply.

It is another object of my invention to provide a power supply that absorbs relatively little power, and therefore has a high efficiency and operates in a cool manner.

It is a further object of my invention to provide a power supply that cuts off and on very quickly on the occurrence and removal of a short-circuit.

The attainment of these objects and others will be realized from the following specification, taken in conjunction with drawings of which—

Broadly stated, my invention contemplates a power supply that uses saturable reactors to control the output. I use another saturable reactor to sense the presence of a short-circuit; this short-circuit-sensing saturable reactor being connected in such a way that it quickly and efficiently disables the power supply when a short-circuit occurs. Circuitry is shown for permitting the power supply to periodically test to find out whether the short-circuit has disappeared; whereupon the power supply is again energized.

Figure 1:
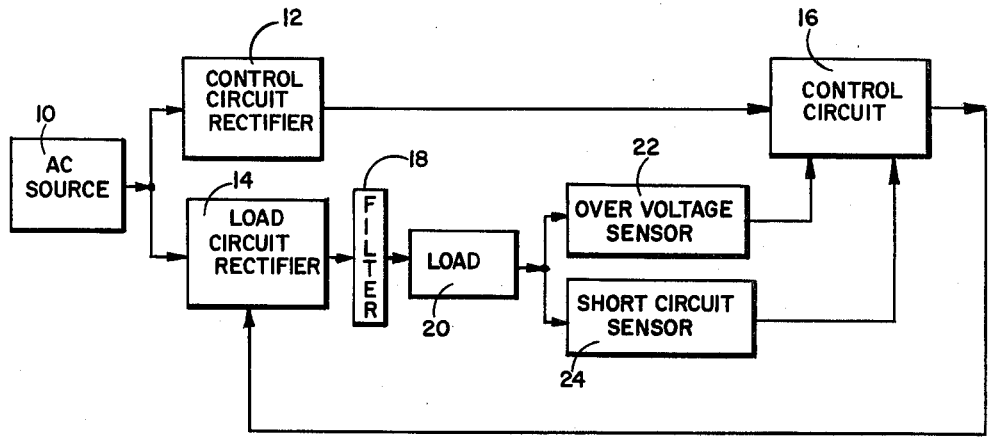
FIGURE 1 is a block diagram embodying my invention.

My invention will be understood from FIGURE 1. Here an A.C. power source 10 energizes two rectifiers; one of them, 12, being designed to supply power for a control circuit, whereas the other one, 14, is designed to supply power for the load.

The output of control-circuit rectifier 12 is applied to a control circuit 16 whose operation will be described in detail later.

Load-circuit rectifier 14 has its output filtered by circuit 18, whose output is then applied to load 20.

Associated with load 20 are two sensors; one of them, 22, sensing an over-voltage condition, while the second sensor, 24, senses a short-circuit condition.

The outputs of these sensors are applied to control-circuit 16 in such a manner that either one of them will modify the operation of the control-circuit. The output of control-circuit 16 is applied to load-circuit rectifier 14 in such a manner that the output of this rectifier is either decreased—in the case of over-voltage, or cut off—in the case of a short-circuit.

Figure 2:
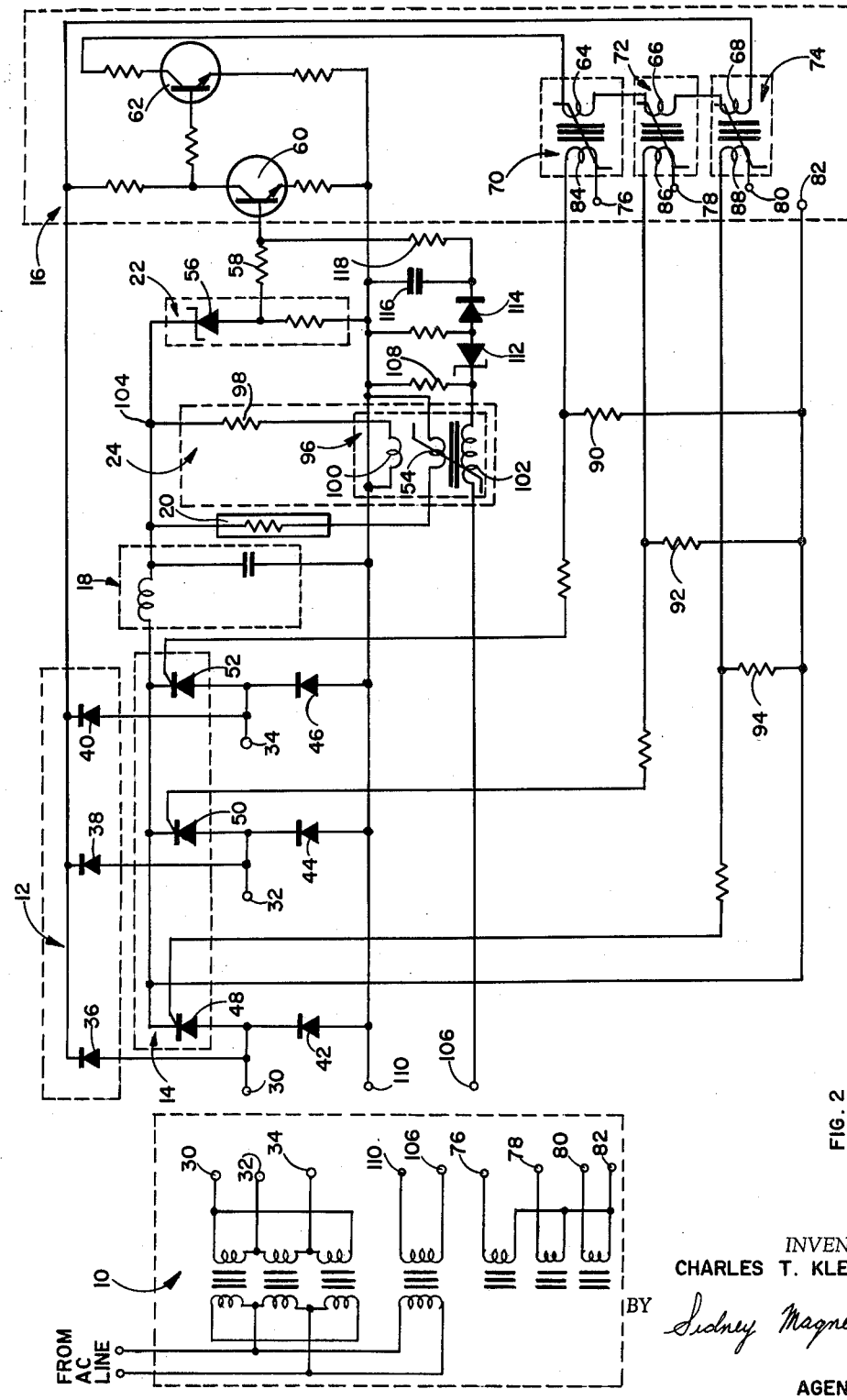
FIGURE 2 is a schematic drawing of a power supply embodying my invention.

Attention is now directed to FIGURE 2, which shows a schematic diagram of the circuit, corresponding portions thereof having the same reference characters as FIGURE 1.

In FIGURE 2, reference character 10 indicates an A.C. source which may be a three-phase, 400-cycle transformer having a plurality of output windings, whose purpose, connections, and functions will become apparent from the following description. The main output of A.C. source 10 appears at terminals 30, 32, and 34.

For clarity, no connections are shown between the terminals 30, 32, and 34 of the A.C. source and the terminals 30, 32, and 34 of the schematic diagram; although of course such connections are essential.

Control-circuit rectifier 12 comprises three diodes 36, 38, and 40; respective diodes being connected to respective phases of the A.C. source as represented by terminals 30, 32, and 34. Each diode 36, 38, 40 acts in conjunction with diodes 42, 44, and 46 to provide full wave rectification, so that the output of control rectifier 12 comprises a series of positive-going signals that are so closely spaced that the output is substantially a direct current. This direct voltage is used as the operating potential for control circuit 16, whose operation will be explained later.

Load-circuit rectifier 14 also comprises three units, silicon controlled rectifiers 48, 50, and 52, that also act as rectifiers for each phase in conjunction with diodes 42, 44, and 46 in the same manner as the diodes comprising control-circuit rectifier 12. When silicon controlled rectifiers 48, 50, and 52 are fully conductive, the output of load-circuit rectifier 14 is also a series of positive-going waveforms that are so closely spaced that the output of circuit 14 is substantially a D.C. voltage. However, in order to provide a smoother D.C. voltage for the load 20, a filtering circuit 18 may be inserted between the output of load-circuit rectifier 14 and load 20. Load 20 is thus applied with a direct voltage that has a minimal ripple.

As may be seen, the direct current flows from load-circuit rectifier 14 through load 20, through a load winding 54 whose operation will be described later, and back to rectifier 14; thus completing the flow of current.

If, for some reason, the voltage should increase, this over-voltage condition is sensed by over-voltage sensor 22. More specifically the over-voltage condition causes zener diode 56 to become conductive, and to transmit a signal through resistor 58 to the control-circuit 16.

Control-circuit 16 comprises a pair of cascaded transistors 60 and 62 that control the flow of direct current through series-connected input windings 64, 66, and 68.

Input windings 64, 66, and 68 are parts of corresponding control saturable-core reactors 70, 72, and 74; these saturable-core reactors having the characteristic that the amount of direct current flowing in their input windings, controls the output of the saturable-core reactors.

A.C. source 10 has three windings whose outputs appear at terminals 76, 78, 80, and 82, which are also shown at the lower right corner of the schematic drawing; and respective phases of the 400 cycle A.C. electricity flow through the "gating" windings 84, 86, and 88 of the control saturable reactors 70, 72, and 74. The 400 cycle current flowing through the gating windings of the control saturable reactors is a function of the saturation of these reactors; which in turn is a function of the amount of D.C. current flowing from the transistors through the input windings 64, 66, and 68.

Assume for the moment that the voltage of the power supply is satisfactory. Control-circuit 16 permits a large current to flow through the series-connected input windings 64, 66, and 68. This large current saturates reactors 70, 72, and 74 so that they have a low impedance. As a result, the 400 cycle electricity flows readily through the gating windings 84, 86, and 88 and the resistors 90, 92, and 94 associated therewith. The voltages developed across these resistors are applied to the "gating" electrodes of silicon controlled rectifiers 48, 50, and 52; this relation explaining why windings 84, 86, and 88 of the saturable reactors 72, 74, and 76 are called "gating" windings. These gating windings thus apply "gating" signals to the gating electrodes; these gating signals being of such values that the silicon controlled rectifiers 48, 50, and 52 are conductive for the full period during which the positive-going portion of the A.C. current is applied to them by A.C. source 10. The result is that load-rectifier 14 produces a direct current having a maximum value.

Assume now that an over-voltage condition exists. Zener diode 56 becomes conductive, and applies a signal through coupling resistor 58 to the control circuit 16. This signal causes control-circuit 16 to reduce the amount of current flowing through the series-connected input windings 64, 66, and 68; so that the impedance of the saturable reactors 70, 72, and 74 is increased. This increased impedance reduces the gating signals applied to the gating electrodes of the silicon controlled rectifiers 48, 50, and 52; so that a somewhat smaller current is produced by the load rectifier 14, resulting in a lower amplitude direct voltage applied to the load 20.

In this way the over-voltage condition is sensed, and control circuit 16 reacts to reduce over-voltage to its desired value.

It was previously indicated that the power supply should disable itself when a short-circuit appears. A short-circuit is a condition wherein a large current may flow through the circuitry, and may thus endanger it by over-heating or burning various parts of the circuit. This is a condition which must be avoided for safety and reliability of operation.

My short-circuit sensor operates as follows. It was previously pointed out that the D.C. current flows through load 20 and load winding 54. Load winding 54 is part of another saturable-core reactor 96. As previously indicated, this power supply is designed for loads that require a large current. The large D.C. current flowing through load winding 54 sets up a condition wherein the core of reactor 96 is saturated. The D.C. load current is so large, if it passes through even a single turn, the effect is to saturate reactor 96. Since reactor 96 is so easily saturated, a short circuit wherein the current increases even more, would only tend to saturate the reactor even more. However, once the reactor is saturated, any additional saturation has no effect.

I therefore use a compensating circuit comprising compensating resistor 98 and a compensating winding 100 that is part of saturable reactor 96. Compensating resistor 98 has a relatively high value, so that it permits the flow of only a small D.C. compensating current that does not affect the operation of the power supply. The small D.C. compensating current flows through compensating winding 100, which has a large number of turns. The direction of current flow and the polarity of compensating winding 100 is such that it counteracts the saturating effect of load winding 54; in this way nullifying the effect of the load current, so that reactor 96 is completely unsaturated under normal conditions. Since the unsaturated reactor 96 has a high impedance, no A.C. current flows through output winding 102.

Assume now that a short-circuit condition exists. The D.C. current flowing through the load 20 and load winding 54 increases, thus tending to increase the saturation of reactor 96. Simultaneously, due to the short-circuit condition, the voltage at point 104 decreases. This decreased voltage decreases the D.C. compensating current flowing through compensating resistance 98 and compensating winding 100; reducing the de-saturating effect, and thus also increasing the saturation of reactor 96.

As a result of both of these cumulative actions, reactor 96 becomes saturated in a very short time. In its saturated state, it offers very little impedance to the flow of A.C. current, and A.C. current flows from terminal 106 through output winding 102 of saturable reactor 96, load resistor 108, and back to terminal 110.

The voltage appearing across resistance 108 causes zener diode 112 to become conductive. The A.C. current flowing through zener diode 112 is transmitted to polarity-control diode 114, which rectifies the A.C. current, thus charging capacitor 116. The voltage at capacitor 116 is coupled by resistor 118 to control circuit 16. Control circuit 16 is thus energized so that, in the manner previously described, it reduces the gating signals applied to the silicon controlled rectifiers 45, 50, and 52, so that they become non-conductive, thus disabling load-circuit rectifier 14. In this way, once a short-circuit condition exists, it is sensed and the power supply is disabled.

It should be noted that the more severe the short circuit becomes, the more current will flow through load 20 and load winding 54, thus more strongly acting to saturate reactor 96. Simultaneously, the more severe the short-circuit becomes, the less current will flow through compensating resistance 98 and compensating winding 100; thus adding to the saturating effect. In this way the combined effect of windings 54 and 100 are such as to more quickly disable the operation of the power supply.

When the power supply is disabled, the flow of current through load 20 and resistance 98 ceases; thus terminating the charging effect on capacitor 116. The charge gradually leaks off through resistor 118, and transistor 60 eventually becomes non-conductive. At this point the power supply becomes operative again.

If the short-circuit still remains, the power supply is quickly disabled again.

Thus the circuit repeatedly tests itself to see whether the short-circuit condition remains; the frequency of this testing being controlled by the values of capacitor 116 and resistance 118.

When the short-circuit condition is removed, the decreased current through the load and load winding 54, and the increased current through resistor 98 and compensating winding 100 co-operate to quickly de-saturate reactor 96; this de-saturation returning control circuit 16 to its normal regulating operation.

It may thus be seen that my short-circuit-sensing circuit is such that it operates quickly and with certainty upon the presence of a short circuit condition; and operates just as quickly and with as much certainty to restore the circuit to its normal operation, once the short-circuit conditions has been removed.

There are times when it is desirable that a power supply be completely desabled on the occurrence of a short-circuit; rather than periodically testing to see whether the short circuit still exists.

Figure 3:
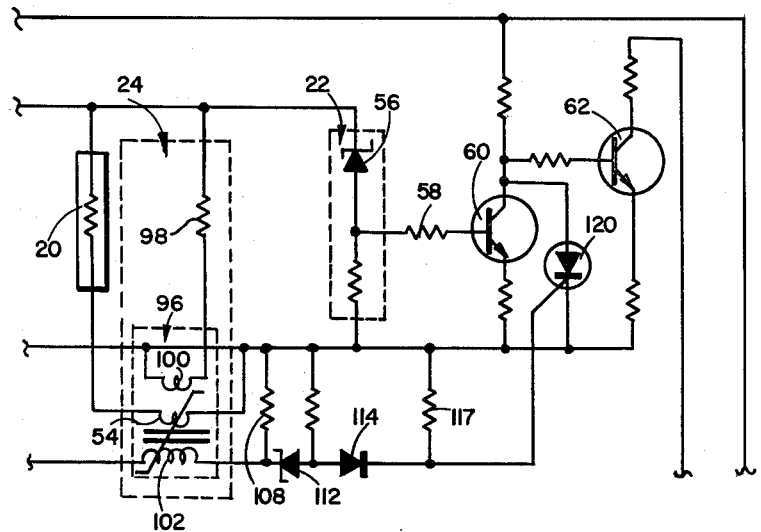
FIGURE 3 is a modification thereof.

The modification shown in FIGURE 3 achieves this result. It will be recalled that a short-circuit condition produces a voltage across capacitor 116, which may if desired be replaced by a resistor 117. In this modification, the voltage is applied to the gating electrode of silicon controlled rectifier 120. This unit thus becomes conductive on the occurrence of a short-circuit, and its shorts out transistor 60 so that the transistor is inoperative. The result is that transistor 62 is cut off, and prevents the flow of current through input windings 64, 66, and 68; thus increasing the impedance of reactors 70, 72, and 74. As previously explained, this disables the power supply.

Silicon controlled rectifier 120 remains conductive, and the power supply remains disabled.

In order to re-energize the power supply, it is necessary to break the circuit that feeds silicon controlled rectifier 120; and this may be done by shutting off A.C. source 10, or inserting a suitable switch.

It may thus be seen that my power supply has a number of advantages over prior-art devices. Firstly, the use of silicon controlled rectifiers makes it very efficient, so that it does not absorb power. Secondly, the silicon controlled rectifiers do not produce any heat, so that cooling is minimized. Thirdly, my power supply turns off much more quickly and reliably than prior-art designs. And fourthly, it may periodically test for the disappearance of the short-circuit; or alternatively, it may be completely disabled.

Although the invention has been described and illustrated in detail, it is to be understood that the same is by way of illustration and example only and is not to be taken by way of limitation, the spirit and scope of this invention being limited only by the terms of the appended claims.

I claim:

1. A circuit for disabling a power supply on the occurrence of a short circuit comprising in combination:
    a saturable-core reactor having a load winding, a compensating winding, and an output winding;
    a D.C. power supply;
    an A.C. power supply;
    a load, said load and said load winding forming a series D.C. current path with said D.C. power supply;
    gating means interposed in the series path of said load for electrically disconnecting said D.C. power source from said load;
    compensating means forming a series D.C. current path with said compensating winding and also forming a parallel D.C. current path with said load winding so as to normally establish a de-saturated condition in said saturable-core reactor;
    an output winding load means, said load means and said output winding forming a series A.C. current path with said A.C. power supply, such that an increase in said D.C. load current tends to saturate said saturable-core reactor, decreasing the flow of compensating current and increasing the flow of A.C. current through said output winding series current path;
    means, energized by the increased A.C. current flow through said output winding providing a temporary actuating signal; and
    control means responsive to said temporary actuating signal providing a gating signal to said gating means so as to effectively disconnect said D.C. power supply from said load;

2. The circuit of claim 1 wherein said means, energized by the increased A.C. current flow through said output winding comprises:
    a diode;
    a capacitor forming a series current path with said diode, said diode and said capacitor connected across said output winding load means; and
    discharge means forming a parallel current path with said capacitor such that the charge on said capacitor may be discharged providing a temporary actuating signal.

3. A circuit for disabling a power supply on the occurrence of a short circuit comprising in combination:
    a saturable-core reactor having a load winding, a compensating winding, and an output winding;
    a D.C. power supply;
    an A.C. power supply;
    a load, said load and said load winding forming a series D.C. current path with said D.C. power supply;
    gating means interposed in the series path of said load for electrically disconnecting said D.C. power source from said load;
    compensating means forming a series D.C. current path with said compensating winding and also forming a parallel D.C. current path with said loading winding so as to normally establish a de-saturated condition in said saturable-core reactor;
    an output winding load means, said load means and said output winding forming a series A.C. current path with said A.C. power supply, such that an increase in said D.C. load current tends to saturate said saturable-core reactor, decreasing the flow of compensating current and increasing the flow of A.C. current through said output winding series current path;
    means, energized by a predetermined increase in the A.C. current flow through said output winding providing an actuating signal; and
    control means responsive to said actuating signal providing a gating signal to said gating means so as to effectively disconnect said D.C. power supply from said load when said A.C. current flow is above said predetermined increase.

4. The circuit of claim 3 wherein said means, energized by a predetermined increase in the A.C. current flow through said output winding comprises:
    a zener diode; and
    a resistor serially connected to said zener diode, said resistor and zener diode connected across said output winding load means such that current flows through said resistor when a predetermined A.C. current flows through said load means providing an actuating signal.

5. The circuit of claim 4 and further comprising:
    a diode; and
    a capacitor forming a series current path with said diode, said capacitor and diode connected across said resistor, so as to detect and rectify the A.C. current flow through said resistor, such that on each half cycle of said A.C. current said capacitor tends to discharge providing a temporary actuating signal.

References Cited by the Examiner

UNITED STATES PATENTS

| | | | |
|---|---|---|---|
| 2,895,085 | 7/1959 | Siedband | 317—31.5 |
| 2,969,495 | 1/1961 | Mosch et al. | 321—14 |
| 3,014,171 | 12/1961 | Cham et al. | 321—25 |
| 3,040,234 | 6/1962 | Walker et al. | 321—14 X |
| 3,045,170 | 7/1962 | Howald | 321—25 X |
| 3,054,041 | 9/1962 | Moore | 321—14 |
| 3,105,184 | 9/1963 | Westlake | 321—18 |
| 3,151,286 | 9/1964 | Berman et al. | 323—22 X |

OTHER REFERENCES

"Controlled Rectifier Power Supply Is Short-Circuit Protected," by B. Berman, published in Electronic Design (Nov. 11, 1959), p. 168.

LLOYD McCOLLUM, *Primary Examiner.*

G. J. BUDOCK, J. C. SQUILLARO,
*Assistant Examiners.*